(12) United States Patent
Fuwamoto et al.

(10) Patent No.: US 11,541,753 B2
(45) Date of Patent: Jan. 3, 2023

(54) VEHICULAR PEDAL DEVICE

(71) Applicant: Toyota Jidosha Kabushiki Kaisha, Toyota (JP)

(72) Inventors: Yoshitaka Fuwamoto, Mishima (JP); Tomoyuki Kuriyama, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 188 days.

(21) Appl. No.: 17/018,183

(22) Filed: Sep. 11, 2020

(65) Prior Publication Data

US 2021/0086614 A1 Mar. 25, 2021

(30) Foreign Application Priority Data

Sep. 20, 2019 (JP) ............................. JP2019-171859

(51) Int. Cl.
*B60K 31/00* (2006.01)
*B60W 50/08* (2020.01)
*B60K 26/02* (2006.01)

(52) U.S. Cl.
CPC .............. *B60K 31/00* (2013.01); *B60K 26/02* (2013.01); *B60W 50/087* (2013.01); *B60W 2540/10* (2013.01); *B60W 2540/12* (2013.01); *B60Y 2300/18191* (2013.01)

(58) Field of Classification Search
CPC ...... B60K 31/00; B60K 26/02; B60K 26/021; B60K 2026/026; B60K 2026/23; B60W 50/087; B60W 50/16; B60W 2540/10; B60W 2540/12; B60W 2540/215; B60W 10/06; B60W 10/08; B60W 2530/10; B60Y 2300/18191; B60T 7/042; B60T 7/06

See application file for complete search history.

(56) References Cited

U.S. PATENT DOCUMENTS

| 5,568,797 | A | * | 10/1996 | Landerretche | ......... | B60K 31/18 123/396 |
|---|---|---|---|---|---|---|
| 6,675,923 | B1 | * | 1/2004 | Artis | .................... | B60K 26/021 180/170 |
| 7,022,045 | B2 | * | 4/2006 | Yone | ........................ | G05G 1/30 701/52 |
| 8,355,851 | B2 | | 1/2013 | Inoue et al. | | |
| 8,370,040 | B2 | | 2/2013 | Inoue et al. | | |
| 8,417,430 | B2 | | 4/2013 | Saeki | | |
| 8,548,709 | B2 | | 10/2013 | Morita | | |
| 8,768,597 | B2 | | 7/2014 | Kagawa | | |

(Continued)

FOREIGN PATENT DOCUMENTS

| JP | 2007-536166 A | 12/2007 |
|---|---|---|
| JP | 2018-069939 A | 5/2018 |
| JP | 2020-059346 A | 4/2020 |

*Primary Examiner* — Phutthiwat Wongwian
*Assistant Examiner* — Sherman D Manley
(74) *Attorney, Agent, or Firm* — Dinsmore & Shohl LLP

(57) ABSTRACT

A vehicular pedal device includes a stroke characteristic control unit that controls a stroke characteristic of the vehicular pedal with respect to a pedaling force of a driver. the stroke characteristic control unit changes the stroke characteristic of the vehicular pedal to a stepped stroke characteristic when the vehicle is under automatic speed control, and the stepped stroke characteristic has a stepping force step corresponding to an override stroke position at which override of automatic speed control is started by operation of the vehicular pedal by the driver.

2 Claims, 7 Drawing Sheets

(56) References Cited

U.S. PATENT DOCUMENTS

| | | | |
|---|---|---|---|
| 9,174,643 B2 | 11/2015 | Aso | |
| 10,017,178 B2 | 7/2018 | Morimoto et al. | |
| 10,118,617 B2 | 11/2018 | Urano et al. | |
| 10,173,680 B2 | 1/2019 | Ono et al. | |
| 10,486,698 B2 | 11/2019 | Masui et al. | |
| 2001/0004723 A1* | 6/2001 | Nishiyama | B60T 8/3215 701/79 |
| 2003/0190996 A1* | 10/2003 | Yone | F02D 11/105 477/120 |
| 2004/0099085 A1* | 5/2004 | Olofsson | G05G 1/30 74/513 |
| 2004/0254048 A1* | 12/2004 | Yone | B60K 26/021 477/108 |
| 2009/0069155 A1* | 3/2009 | Dickinson | F16H 59/20 477/133 |
| 2012/0167708 A1* | 7/2012 | Brandt | G05G 5/03 74/513 |
| 2019/0381881 A1* | 12/2019 | Tayama | G05G 1/30 |
| 2020/0039350 A1* | 2/2020 | Tayama | G05G 1/60 |
| 2021/0141411 A1* | 5/2021 | Kitagawa | G05G 1/30 |

\* cited by examiner

VEHICULAR PEDAL DEVICE

CROSS-REFERENCE TO RELATED APPLICATION

This application claims the benefit of priority from Japanese Patent Application No. 2019-171859, filed Sep. 20, 2019, the entire content of which are incorporated herein by reference.

TECHNICAL FIELD

The present disclosure relates to a vehicular pedal device.

BACKGROUND

Conventionally, Japanese Patent Application Laid-Open No. 2018-69939 is known as a technical document related to a vehicular pedal device. This publication discloses a vehicular accelerator pedal device that moves an accelerator pedal to a position beyond an initial position (reference position) in a direction opposite to a stepping direction by applying an additional reaction to the accelerator pedal during autonomous driving of a car. In this vehicular accelerator pedal device, the driver depresses the accelerator pedal to a predetermined position exceeding the reference position at the time of autonomous driving to release the autonomous driving.

SUMMARY

However, the above-described conventional device has a problem in that the accelerator pedal is maintained at a position higher than the normal position due to the additional reaction, and it is difficult for the driver to grasp to what extent the autonomous driving can be released by depressing the accelerator pedal.

According to an aspect of the present disclosure, a vehicular pedal device for controlling a vehicular pedal including at least one of an accelerator pedal and a brake pedal provided in a vehicle having an automatic speed control function, the vehicular pedal device comprising: a stroke characteristic control unit that controls a stroke characteristic of the vehicular pedal with respect to a pedaling force of a driver. The stroke characteristic control unit changes the stroke characteristic of the vehicular pedal to a stepped stroke characteristic when the vehicle is under automatic speed control, and the stepped stroke characteristic is a stroke characteristic having a stepping force step corresponding to an override stroke position at which override of the automatic speed control is started by operation of the vehicular pedal by the driver.

According to the vehicular pedal devices changes a stroke characteristic of a pedal for vehicles to a stepped stroke characteristic having a stepping force step corresponding to an override stroke position at which override of automatic speed control is started when the vehicles are performing automatic speed control such as autonomous driving or ACC. Therefore, in this vehicular pedal device, since the stepping force level difference that the driver feels while stepping on the pedal for a vehicle during the automatic speed control corresponds to the override stroke position at which the override of the automatic speed control (release of the automatic speed control) is started, the driver can grasp the override stroke position of the pedal for a vehicle by the presence of the stepping force level difference at the time of stepping on.

In the above-described vehicular pedal device, the vehicular pedal includes the accelerator pedal, and the stroke characteristic control unit controls the stepped stroke characteristic of the accelerator pedal such that a start position of the stepping force step is closer to an initial position of the accelerator pedal when the vehicle is decelerated by the automatic speed control than when the vehicle is not decelerated by the automatic speed control.

According to this pedal apparatus for a vehicle, when the vehicle is decelerated by the automatic speed control, the stepped stroke characteristic of the accelerator pedal is controlled so that the starting position of the stepping force step approaches the initial position of the accelerator pedal, whereby the driver placing his/her foot on the accelerator pedal can grasp the deceleration of the vehicle from an increase in the reaction force of the accelerator pedal. Further, according to the pedal apparatus for a vehicle, the stepped stroke characteristic of the accelerator pedal is controlled so that the starting position of the stepping force step approaches the initial position of the accelerator pedal, whereby the driver can be urged to turn off the accelerator, and the driver can be suppressed from erroneously stepping on the accelerator pedal during deceleration of the vehicle or during stopping after deceleration.

The vehicular pedal device may further include an elastic member configured to apply a reference reaction force to the vehicular pedal with respect to the stepping force of the driver, and a reaction force applying actuator that applies an additional reaction force to the vehicular pedal. The stroke characteristic control unit changes the stroke characteristic of the vehicular pedal to the stepped stroke characteristic by controlling the additional reaction force by the reaction force applying actuator.

According to the vehicular pedal device, since the elastic member for applying the reference reaction force and the reaction force applying actuator are configured to cooperate with each other, the load of the reaction force applying actuator can be reduced as compared with a case where all the reaction forces are controlled only by the reaction force applying actuator.

According to one aspect of the present disclosure, the driver can grasp the override stroke position of the pedal for a vehicle by the presence of the stepping force step at the time of stepping on.

DETAILED DESCRIPTION

Hereinafter, embodiments of the present disclosure will be described with reference to the drawings.

Figure 1:
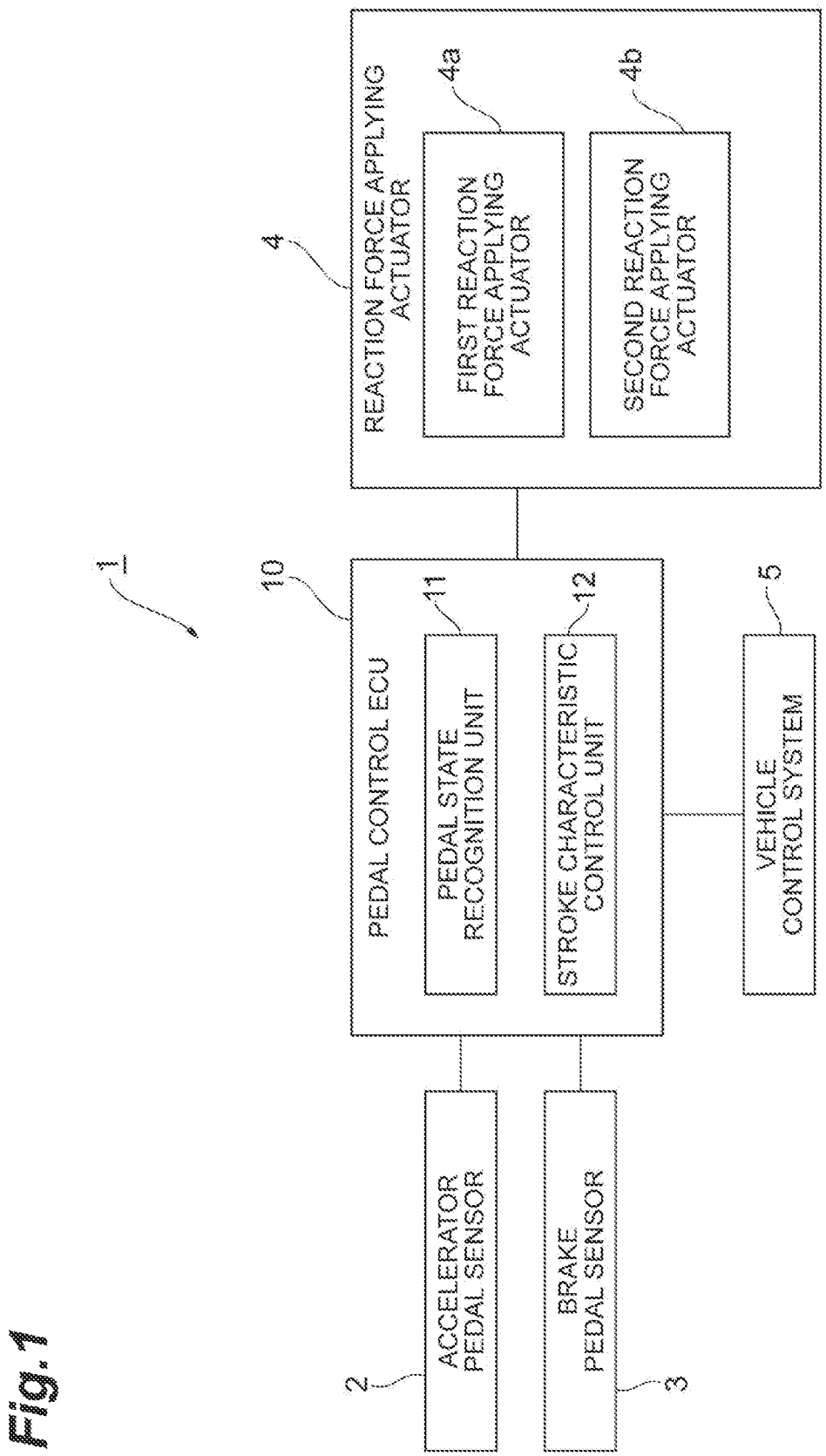
FIG. 1 is a block diagram illustrating showing a vehicular pedal device according to an embodiment.

FIG. 1 is a block Fig. showing a vehicular pedal device according to an embodiment. The vehicular pedal device 1 shown in FIG. 1 is a device that is mounted on vehicles having an automatic speed control function and controls vehicular pedals. The vehicular pedal device 1 controls the stroke characteristic of the vehicular pedal when the automatic speed control is performed. The stroke characteristics will be described in detail later.

The automatic speed control is a function of automatically controlling the vehicle speed of the vehicle. The automatic speed control includes automatic speed control as driving support such as adaptive cruise control (ACC) and automatic speed control as autonomous driving. The automatic speed control is released when the driver deeply depresses the vehicular pedal. The cancellation of the automatic speed control by the operation of the driver is called override.

Figure 2:
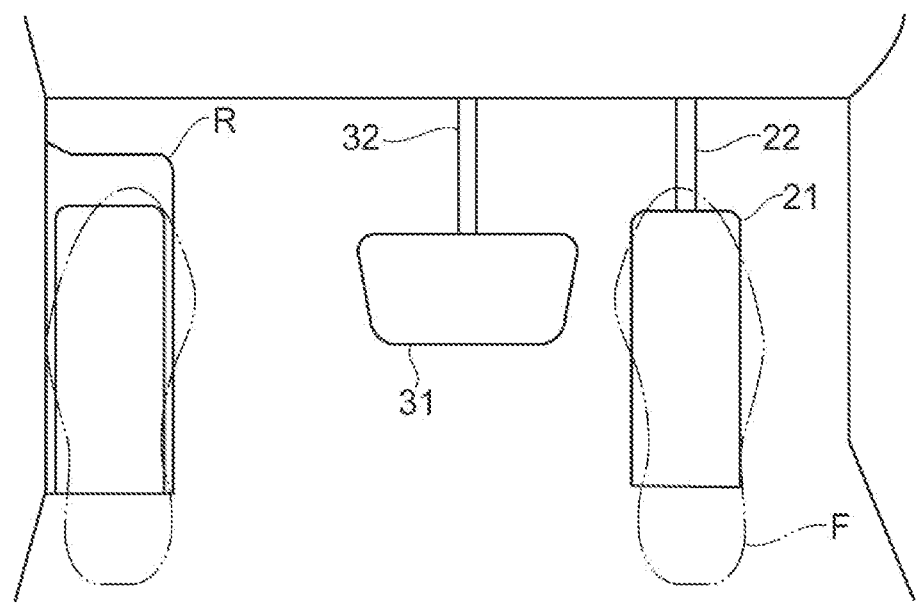
FIG. 2 is a illustrating showing an example of the arrangement of the vehicular pedal.

The vehicular pedal includes at least one of an accelerator pedal and a brake pedal of the vehicle. Here, FIG. 2 is a Fig. showing an example of the arrangement of the vehicular pedals. FIG. 2 shows an accelerator pedal 21, an accelerator arm 22, a brake pedal 31, and a brake arm 32. Also shown are the driver's feet F and foot rest R. In the present embodiment, the vehicular pedal includes both the accelerator pedal 21 and the brake pedal 31.

Configuration of Vehicular Pedal Device

The configuration of the vehicular pedal device 1 according to the present embodiment will be described with reference to the Fig. surface. As shown in FIG. 1, the vehicular pedal device 1 includes a pedal control electronic control unit (ECU) 10 that manages the device. The pedal control ECU 10 is an electronic control unit including a central processing unit (CPU), a read only memory (ROM), a random access memory (RAM), and the like. In the pedal control ECU 10, for example, various functions are realized by loading a program stored in the ROM into the RAM and executing the program loaded into the RAM by the CPU. The pedal control ECU 10 may include a plurality of electronic units. The pedal control ECU 10 may be configured as a part of an ECU that performs various controls of the vehicle.

The pedal control ECU 10 is connected to the accelerator pedal sensor 2, the brake pedal sensor 3, the reaction force applying actuator 4, and the vehicle control system 5.

The accelerator pedal sensor 2 is a sensor that is provided for an accelerator pedal of a vehicle and detects an operation of the accelerator pedal by a driver. The accelerator pedal sensor 2 detects, for example, the amount of depression of the accelerator pedal by the driver (the stroke position of the accelerator pedal). The stroke position is a position of inclination of the pedal in the stepping direction of the driver. The accelerator pedal sensor 2 transmits an accelerator pedal state signal corresponding to the detection result to the pedal control ECU 10.

The brake pedal sensor 3 is a sensor that is provided for a brake pedal of the vehicle and detects an operation of the brake pedal by the driver. The brake pedal sensor 3 detects, for example, the amount of depression of the brake pedal by the driver (the stroke position of the brake pedal). The brake pedal sensor 3 transmits a brake pedal state signal corresponding to the detection result to the pedal control ECU 10.

The reaction force applying actuator 4 is an actuator that applies an additional reaction force to the pedal force of the driver to the vehicular pedal. The reaction force applying actuator 4 applies a reaction force to the vehicular pedal in response to a control signal from the pedal control ECU 10.

The reaction force applying actuator 4 includes a first reaction force applying actuator 4a for an accelerator pedal and a second reaction force applying actuator 4b for a brake pedal. The first reaction force applying actuator 4a applies a reaction force to the accelerator pedal 21 by, for example, applying a force to the accelerator arm 22 of the accelerator pedal 21.

The configuration of the first reaction force applying actuator 4a is not particularly limited. The first reaction force applying actuator 4a may be a direct-acting actuator using electric power or air pressure. The first reaction force applying actuator 4a may be a rotary actuator that applies a reaction force by applying a rotational torque to the vehicular pedal by an electric motor. The first reaction force applying actuator 4a may be constituted by a plurality of actuators.

The second reaction force applying actuator 4b applies a reaction force to the brake pedal 31 by, for example, applying a force to the brake arm 32 of the brake pedal 31. The configuration of the second reaction force applying actuator 4b is not particularly limited as in the first reaction force applying actuator 4a. The second reaction force applying actuator 4b may also be a linear actuator or a rotary actuator. The second reaction force applying actuator 4b may also include a plurality of actuators.

The vehicle control system 5 is a system that executes automatic speed control of a vehicle. The vehicle control system 5 may be a driving support system that performs automatic speed control as driving support such as ACC or CACC of the vehicle.

The ACC is a control in which when there is no preceding vehicle in front of the car, the car is caused to travel at a constant speed set in advance, and when there is a preceding vehicle, the car speed is controlled in accordance with the inter-car distance between the car and the preceding vehicle. The vehicle speed adjustment as the driving support may include CACC (Cooperative Adaptive Cruise Control). The CACC further utilizes inter-vehicle communication in the ACC. In the CACC, for example, by acquiring travel information of the preceding vehicle (such as the speed and accelerations of the preceding vehicle) through vehicle-to-vehicle communication between the vehicles and the preceding vehicle, it is possible to adjust the speed of the vehicles earlier than when a change in the distance between the vehicles and the preceding vehicle is detected by the sensors of the vehicles. The control contents of the ACC and the CACC are not limited to those described above. The vehicle speed adjustment as the driving support is not limited to the ACC and the CACC.

The vehicular control system 5 may be an autonomous driving system that performs autonomous driving of vehicles. The autonomous driving is a car control for automatically running the car along a preset target route. In autonomous driving, the driver does not need to perform a driving operation, and the car travels automatically. The target route is a route on the map along which vehicles travel in the autonomous driving. The target route may be set so as to reach a destination set by the driver, or may be automatically set on the vehicle side, for example, to avoid a parked vehicle on a roadside zone. In autonomous driving, steering control and speed control are automatically performed. The autonomous driving may include vehicular controls corresponding to autonomous driving level 2 to autonomous driving level 4 defined in SAE [Society of Automotive Engineers] J3016.

When executing the automatic speed control, the vehicle control system 5 transmits an automatic speed control signal to the pedal control ECU 10. When the override signal is transmitted from the pedal control ECU 10 while the vehicle is executing the automatic speed control, the vehicle control system 5 cancels the automatic speed control by the override. When autonomous driving is being executed, autonomous driving itself is canceled. The vehicle control system 5 may transmit a deceleration signal to the pedal control ECU 10 when the vehicle is decelerated by the automatic speed control.

Next, a functional configuration of the pedal control ECU 10 will be described. As shown in FIG. 1, the pedal control ECU 10 includes a pedal state recognition unit 11 and a stroke characteristic control unit 12.

The pedal state recognition unit 11 recognizes the stroke position of the vehicular pedal (the position of the inclination of the accelerator pedal 21 in the stepping direction of the driver). The pedal state recognition unit 11 recognizes the stroke position of the vehicular pedal based on the accelerator pedal state signal from the accelerator pedal sensor 2 and the brake pedal state signal from the brake pedal sensor 3. Further, the pedal state recognition unit 11 determines, from the stroke position of the vehicular pedal, whether the vehicular pedal is in an ON state in which the driver is stepping on the vehicular pedal or in an OFF state in which the driver is not stepping on the vehicular pedal. Here, FIG. 3 is a Fig. showing an example of a peripheral configuration of the accelerator pedal 21.

Figure 3:
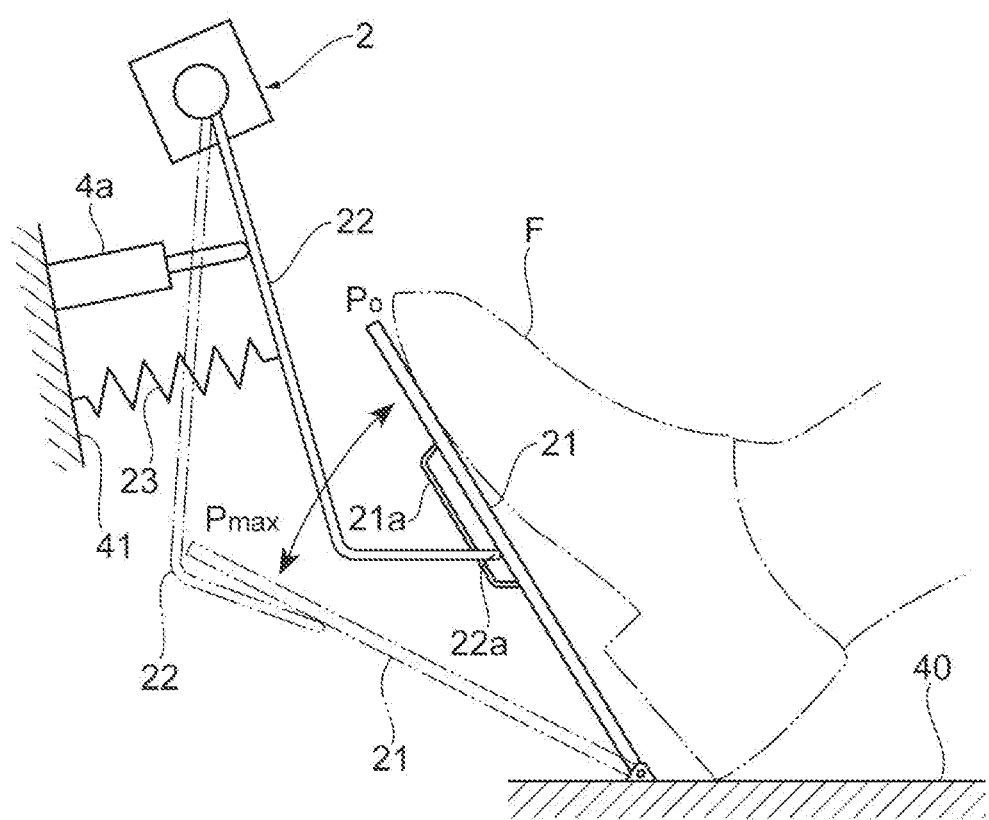
FIG. 3 is a illustrating showing an example of a peripheral configuration of an accelerator pedal.

Shown in FIG. 3 are an accelerator pedal sensor 2, a first reaction force applying actuator 4a, an accelerator pedal 21, an accelerator arm 22, an accelerator pedal elastic member 23, a vehicular driver's foot floor 40, a vehicular dash panel 41, and a driver's foot F.

The initial position P0 of the accelerator pedal 21 and the maximum stroke position Pmax of the accelerator pedal 21 are shown in FIG. 3. The initial position P0 of the accelerator pedal 21 is a stroke position serving as a reference for returning the accelerator pedal 21 when the driver's stepping force is not applied to the accelerator pedal 21 (when the accelerator is off). The maximum stroke position Pmax of the accelerator pedal 21 is a maximum stroke position at which the accelerator pedal 21 can be inclined.

The accelerator pedal 21 shown in FIG. 3 is provided so as to be swingable in the driver's stepping direction (the direction of the arrow in FIG. 3) with respect to the foot floor 40. A guide slot 21a is formed in the rear surface of the accelerator pedal 21 along the longitudinal direction of the rear surface of the accelerator pedal 21, and a mounting portion 22a at the lower end of the accelerator arm 22 is slidably mounted along the guide slot 21a.

The accelerator pedal sensor 2 is provided, for example, at a base point of the swinging accelerator arm 22, and detects a stroke position of the accelerator pedal 21 (a depression amount of the driver) from an angle of the accelerator arm 22.

The elastic member 23 is a member for applying a reference reaction force to the accelerator arm 22. The elastic member 23 may be formed of a spring or an elastic material such as rubber. The reference reaction force is a reaction force applied by the elastic member 23 to the stepping force of the driver. The elastic member 23 applies a reference reaction force so that the accelerator pedal 21 returns to the initial position P0.

The elastic member 23 is provided, for example, between a dash panel 41 and an accelerator arm 22 of the vehicle. The elastic member 23 contracts when the accelerator pedal 21 is depressed by the driver and the accelerator arm 22 approaches the dash panel 41, and applies a reference reaction force to the accelerator arm 22 by elasticity. The elastic member 23 may be disposed at any position as long as it can apply the reference reaction force to the accelerator pedal 21. The elastic member 23 may be provided on the rear surface of the accelerator pedal 21.

The first reaction force applying actuator 4a is provided, for example, between a dash panel 41 and an accelerator arm 22 of the vehicle. The first reaction force applying actuator 4a shown in FIG. 3 is a direct-acting actuator in which a telescopic rod can be linearly inserted and withdrawn. The first reaction force applying actuator 4a applies an additional reaction force to the accelerator arm 22 by a telescopic rod that abuts against or is connected to the accelerator arm 22.

The extendable rod of the first reaction force applying actuator 4a does not need to be always connected to the rear surface of the accelerator arm 22. The extendable rod may be separated from the accelerator arm 22 when the accelerator pedal 21 is in the initial position, and may be configured to abut against the accelerator arm 22 when the accelerator pedal 21 is depressed by a certain amount by the driver.

The configuration around the brake pedal 31 may be similar to the configuration around the accelerator pedal 21. The brake pedal sensor 3 is provided, for example, at a base point of the swinging brake arm 32, and detects a stroke position of the brake pedal 31 (depression amount of the driver) from an angle of the brake arm 32. The elastic member of the brake pedal 31 is provided, for example, between a dash panel 41 and a brake arm 32 of the vehicle, and applies a reference reaction force to the brake pedal 31. The second reaction force applying actuator 4b is provided, for example, between a dash panel 41 and an accelerator arm 22 of the vehicle, and applies an additional reaction force to the brake pedal 31 by an extendable rod.

Figure 4:
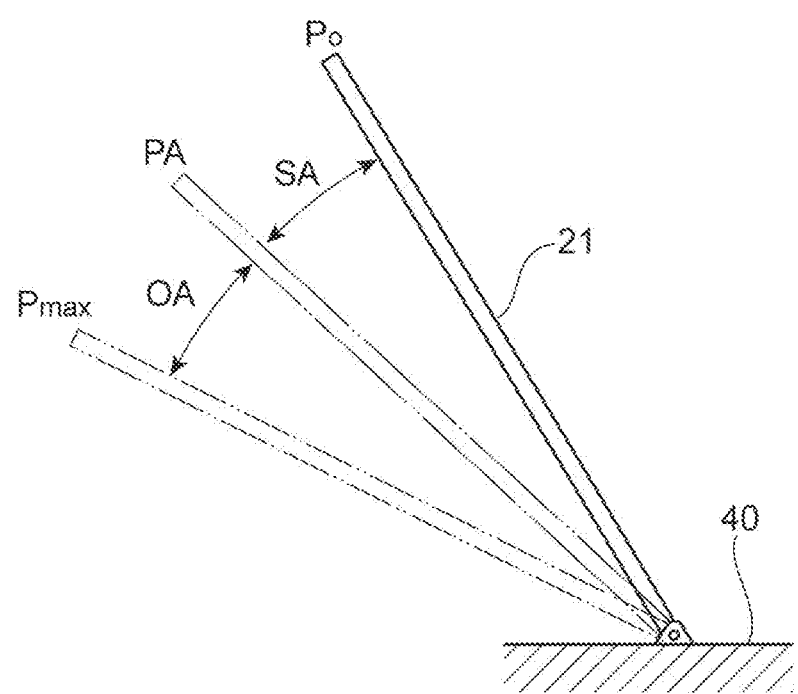
FIG. 4 is a illustrating for explaining the override stroke position.

When the vehicle is executing the automatic speed control, the pedal state recognition unit 11 determines whether or not the driver has performed override by stepping on the vehicular pedal. Here, FIG. 4 is a Fig. for explaining the override stroke position. FIG. 4 shows the override stroke position PA, the controlled vehicle speed region SA, and the override region OA. The override stroke position PA is a stroke position at which the override of the automatic speed control is started by the operation of the vehicular pedal by the driver. The controlled vehicle speed region SA is a region from the initial position P0 to the override stroke position PA. The override area OA is an area from the override stroke position PA to the maximum stroke position Pmax.

As shown in FIG. 4, when the stroke position of the vehicular pedal exceeds the override stroke position PA due to the driver's depression, the pedal state recognition unit 11 determines that the driver has performed override. The pedal state recognition unit 11 transmits an override signal to the vehicle control system 5 when it is determined that the driver has performed override.

When the stroke position of the vehicular pedal shifts from the controlled vehicle speed region SA to the override region OA due to the driver's depression, the pedal state recognition unit 11 instructs the vehicle control system 5 to accelerate or decelerate in accordance with the stroke position of the vehicular pedal. Before the override is completed, the pedal state recognition unit 11 instructs acceleration or deceleration in accordance with the driver's stepping to the override area OA.

When the stroke position of the accelerator pedal 21 is shifted to the override region OA by the driver's depression, the pedal state recognition unit 11 instructs the vehicle control system 5 to accelerate according to the stroke position of the accelerator pedal 21. When the stroke position of the brake pedal 31 is shifted to the override area OA by the driver's depression, the pedal state recognition unit 11 instructs the vehicle control system 5 to decelerate according to the stroke position of the brake pedal 31. Thus, the driver can reflect the pedal operation on the vehicle speed of the vehicle without waiting for the completion of the override. The pedal state recognition unit 11 does not instruct the vehicle control system 5 to accelerate or decelerate while the stroke position of the vehicular pedal is within the control vehicle speed region SA.

The stroke characteristic control unit 12 changes the stroke characteristic of the vehicular pedal when the vehicle is executing the automatic speed control. The stroke characteristic is a characteristic relating to a change in the stroke position of the vehicular pedal with respect to the stepping force of the driver. The stepping force of the driver is a force of stepping on the vehicular pedal. The pedaling force of the driver can be indicated using the unit Nm, for example. The stroke characteristic control unit 12 changes the stroke characteristic by controlling the reaction force applying actuator 4.

The stroke characteristic control unit 12 changes the stroke characteristic of the vehicular pedal from the normal stroke characteristic to the stepped stroke characteristic when the vehicle is executing the automatic speed control. The stepped stroke characteristic is a stroke characteristic having a stepping force step corresponding to the override stroke position PA. The pedal effort level difference is a portion of the stroke characteristic that causes the driver to feel a change in the state of the vehicular pedal due to a sudden decrease in the change in the stroke position of the vehicular pedal with respect to an increase in the pedal effort of the driver.

Figure 5A:
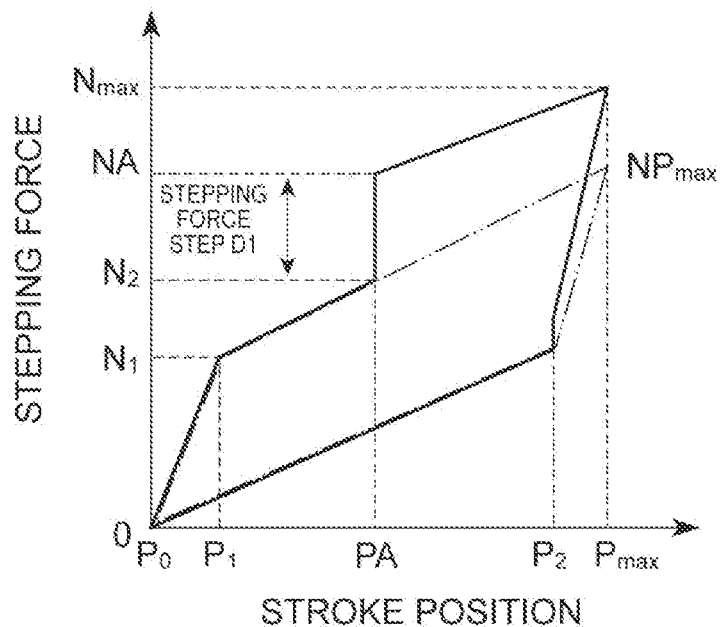
FIG. 5A is a graph showing an example of stepped stroke characteristics.

FIG. 5A is a graph showing an example of the stepped stroke characteristic with respect to the pedaling force of the driver. The vertical axis represents the stepping force of the driver, and the horizontal axis represents the stroke position of the vehicular pedal. In the FIG. 5A, a stroke characteristic at a normal time is indicated by a 2 dot chain line, and a stepped stroke characteristic is indicated by a solid line. The upper side of the graph corresponds to the stroke characteristic when the driver depresses the vehicular pedal, and the lower side of the graph corresponds to the stroke characteristic when the driver releases the depression after the driver depresses the vehicular pedal. When the depression is released, the vehicular pedal is returned to the initial position P0 by the reaction force.

FIG. 5A shows an initial position P0, a first stroke position P1, an override stroke position PA, a second stroke position P2, and a maximum stroke position Pmax. The override stroke position PA is located between the first stroke position P1 and the second stroke position P2.

Further, FIG. 5A shows the pedal force N1 required to reach the first stroke position P1, the pedal force N2 required to reach the override stroke position PA, the pedal force NPmax required to reach the maximum stroke position Pmax in the normal stroke characteristic, the pedal force NA required to exceed the override stroke position PA in the stepped stroke characteristic, the stepping force step D1 in the stepped stroke characteristic, and the pedal force Nmax required to reach the maximum stroke position Pmax in the stepped stroke characteristic.

As shown in FIG. 5A, in the normal stroke characteristic, the change rate of the stroke position with respect to the increase of the pedaling force changes with the first stroke position P1 as a boundary when the driver steps on. That is, the rate of change from the initial position P0 to the first stroke position P1 is different from the rate of change from the first stroke position P1 to the maximum stroke position Pmax. Each change rate is a constant value (I.e., linear change). As compared with the range from the initial position P0 to the first stroke position P1, the rate of change of the stroke position with respect to the increase of the pedaling force is larger from the first stroke position P1 to the maximum stroke position Pmax.

In addition, in the normal stroke characteristic, when the driver releases the vehicular pedal after stepping on the vehicular pedal, the change rate of the stroke position with respect to the decrease in the pedal effort changes at the second stroke position P2. The pedal effort in this case means a pedal effort required to maintain the stroke position against the reaction force. That is, the rate of change from the maximum stroke position Pmax to the second stroke position P2 is different from the rate of change from the second stroke position P2 to the initial position P0. Each change rate is a constant value (i.e., linear change). As compared with the case where the stroke position returns from the maximum stroke position Pmax to the second stroke position P2, the rate of change of the stroke position with respect to the decrease of the pedaling force is larger until the stroke position returns from the second stroke position P2 to the initial position P0.

In the normal stroke characteristic, the change rate before and after the override stroke position PA when the driver steps on is constant. In this state, the driver cannot grasp from the feeling of the vehicular pedal whether or not the driver has stepped on the vehicular pedal beyond the override stroke position PA.

On the other hand, the stepped stroke characteristic shown in FIG. 5A is different from the stroke characteristic at the normal time in that the stepped stroke characteristic has a pedal effort step D1 corresponding to the override stroke position PA.

The stepping force step D1 is provided so as to correspond to the stepping time of the driver in the stepped stroke characteristic. In the pedal effort step D 5 shown in FIG. 5A, the stroke position does not change until the pedal effort of the driver reaches the pedal effort NA from the pedal effort N2. The height of the pedal effort level difference D1 (the difference between the pedal effort N2 and the pedal effort NA) is not particularly limited as long as the driver can notice the pedal effort level difference. The height of the stepping force step D1 can be set to 8 Nm or more, for example, 10 Nm. The height of the stepping force step D1 may be 15 Nm or less.

In the stepped stroke characteristic shown in FIG. 5A, when the override stroke position PA is reached when the driver depresses the pedal, the stroke position of the vehicular pedal does not change unless the driver depresses the pedal from the depression force N2 to the depression force NA. Therefore, when the driver does not intend to override the automatic speed control, the driver can place his/her foot on the vehicular pedal at the override stroke position PA by using the stepping force step D1.

Further, when the override of the automatic speed control becomes necessary, the driver can start the override only by further depressing the vehicular pedal depressed to the override stroke position PA and exceeding the stepping force step D1. Further, the driver can grasp that the override start operation has been performed from the feeling of the vehicular pedal stepping over the stepping force step D1.

Note that the stepped stroke characteristic (the side having no stepping force step) at the time of releasing the driver's stepping on the vehicular pedal is not particularly limited. When the depression is released, for example, the stepped stroke characteristic and the normal stroke characteristic can be made substantially the same.

The stroke characteristic control unit 12 controls the stepped stroke characteristic of the accelerator pedal 21 during deceleration of the automatic speed control. The stroke characteristic control unit 12 controls (adjusts) the stepped stroke characteristic of the accelerator pedal 21 such that the starting position of the stepping force step is closer to the initial position P0 when the vehicle is decelerated by the automatic speed control than when the vehicle is not decelerated by the automatic speed control.

Figure 5B:
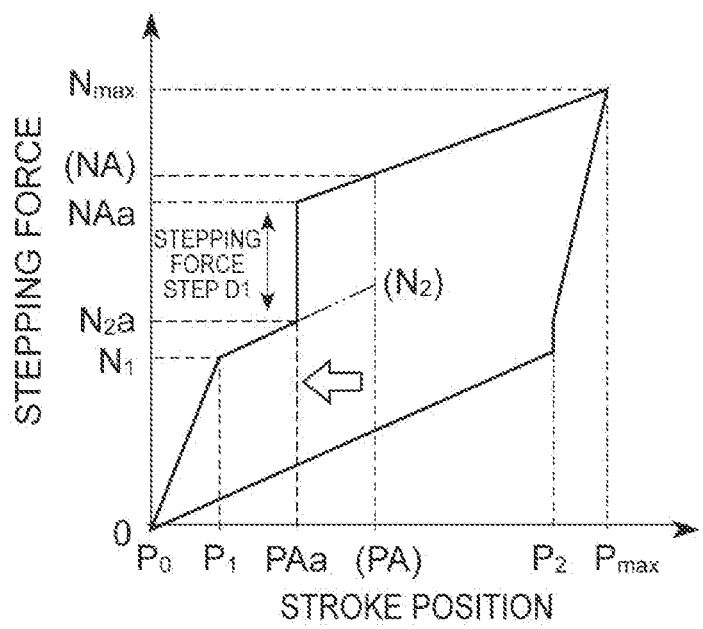
FIG. 5B is a graph for explaining an example of control of the stepped stroke characteristic during deceleration.

FIG. 5B is a graph for explaining an example of control of the stepped stroke characteristic when the speed of the motor vehicle is reduced by the speed control. In FIG. 5B, the stepped stroke characteristic in the normal state is shown by a 2 dot chain line, and the stepped stroke characteristic when the speed of the motor vehicle is reduced by the automatic speed control is shown by a solid line. The override stroke position PAa at the time of deceleration, the pedal effort N2a required to reach the override stroke position PAa at the time of deceleration, and the pedal effort NaA required to exceed the override stroke position PAa at the time of deceleration are also shown. The override stroke position PAa in FIG. 5B corresponds to the start position of the pedal effort level difference D1.

As shown in FIG. 5B, the override stroke position PAA during deceleration is closer to the initial position P0 of the accelerator pedal 21 than the override stroke position PA during normal operation. The pedaling force N2a during deceleration is smaller than the pedaling force N2 during normal operation. The pedaling force NAa during deceleration is smaller than the pedaling force NA during normal operation. The height of the stepping force step D1 at the time of deceleration corresponds to the difference between the stepping force N2a and the stepping force NAa.

The height of the stepping force step D1 at the time of deceleration is higher than that at the normal time. It is not always necessary to set the height of the pedal effort level difference D1 at the time of deceleration higher than that at the time of normal operation. The height of the stepping force step D1 at the time of deceleration may be the same as that at the normal time or may be lower than that at the normal time.

For example, when the speed of the motor vehicle is reduced by the automatic speed control, the stroke characteristic control unit 12 controls the stepped stroke characteristic shown in FIG. 5A to the stepped stroke characteristic shown in FIG. 5B to bring the start position of the stepping force step D1 closer to the initial position P0. As a result, the driver is prompted to turn off the accelerator, so that it is possible to prevent the driver from erroneously depressing the accelerator pedal 21 when the vehicle decelerates or stops.

Note that the stroke characteristic control unit 12 may move the start position of the pedal effort level difference D1 in accordance with the vehicle speed of the vehicle during deceleration by the automatic speed control of the vehicle. The stroke characteristic control unit 12 controls the stepped stroke characteristic such that the starting position of the pedal effort level difference D1 approaches the initial position P0 as the vehicle speed of the vehicle decreases, for example. The stroke characteristic control unit 12 may control the stepped stroke characteristic such that the start position of the pedal effort level difference D1 coincides with the initial position P0 when the vehicle is stopped.

The stroke characteristic control unit 12 may change the stepped stroke characteristic to the normal stroke characteristic when the vehicle is brought into a stopped state due to deceleration by the automatic speed control of the vehicle. Alternatively, the stroke characteristic control unit 12 may change the stepped stroke characteristic to the normal stroke characteristic when the vehicle speed of the vehicle becomes equal to or lower than the change cancellation threshold value due to deceleration of the automatic speed control. The change cancellation threshold is not particularly limited, and may be, for example, 10 km/h.

Figure 6A:
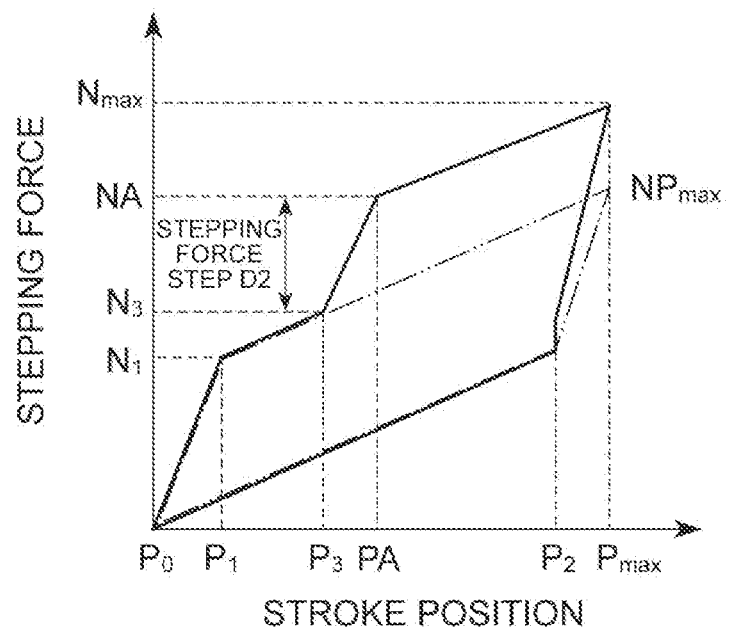
FIG. 6A is a graph showing another example of stepped stroke characteristics.

Next, another example of the stepped stroke characteristic will be described. FIG. 6A is a graph showing another example of the stepped stroke characteristic. In the FIG. 6A, a stroke characteristic at a normal time is indicated by a 2 dot chain line, and a stepped stroke characteristic is indicated by a solid line. In the stepped stroke characteristic shown in FIG. 6A, the stepping force step D2 is inclined with respect to the stroke position. In FIG. 6A, the starting position P2 of the stepping force step D3 and the stepping force N3 required to reach the starting position P3 are shown.

As shown in FIG. 6A, the starting position P2 of the stepping force step D3 does not coincide with the override stroke position PA. The override stroke position PA in this case corresponds to the end position of the pedal effort level difference D2. As described above, the pedal effort level difference corresponding to the override stroke position PA includes a case where the end position of the pedal effort level difference corresponds to the override stroke position PA.

The end position of the stepping force step may be located before the override stroke position PA. The end position of the stepping force step may be slightly separated from the override stroke position PA to have a margin. This also applies to the FIG. 5A. The height of the stepping force step D2 may be the same as or different from the stepping force step D1. The height of the stepping force step D2 can be set to 8 Nm or more, for example, 10 Nm. The height of the stepping force step D2 may be 15 Nm or less.

Figure 6B:
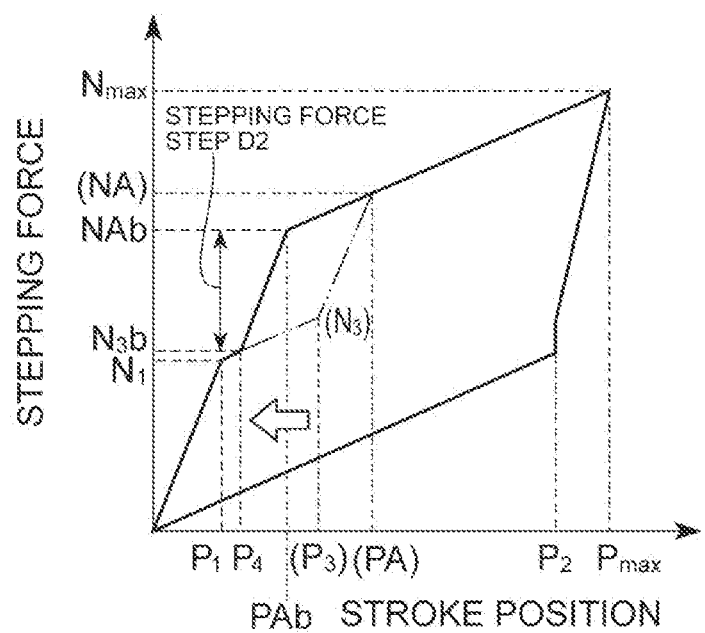
FIG. 6B is a graph for explaining another example of the control of the stepped stroke characteristic during deceleration.

FIG. 6B is a graph for explaining another example of control of the stepped stroke characteristic during deceleration. In FIG. 6B, the stepped stroke characteristic in the normal state is shown by a 2 dot chain line, and the stepped stroke characteristic when the speed of the motor vehicle is reduced by the automatic speed control is shown by a solid line. Further, an override stroke position PAb at the time of deceleration, a pedal effort N3b required to reach the override stroke position PAb at the time of deceleration, a pedal effort NAb required to exceed the override stroke position PAb at the time of deceleration, and a start position P2 of the pedal effort step D4 are shown.

The override stroke position PAb during deceleration is closer to the initial position P0 of the accelerator pedal 21 than the override stroke position PA during normal operation. The pedaling force N3b during deceleration is smaller than the pedaling force N3 during normal operation. The pedaling force NAb during deceleration is smaller than the pedaling force NA during normal operation. The height of the stepping force step D2 at the time of deceleration corresponds to the difference between the stepping force N2b and the stepping force NAb. The height of the stepping force step D2 at the time of deceleration is higher than that at the normal time. It is not always necessary to set the height of the pedal effort level difference D2 at the time of deceleration higher than that at the time of normal operation. The height of the stepping force step D2 at the time of deceleration may be the same as that at the time of normal operation or may be lower than that at the time of normal operation.

The stroke characteristic control unit 12 sets the start position P3 of the pedal effort level difference D2 to the start position P4 close to the initial position P0 by controlling from the stepped stroke characteristic shown in FIG. 6A to the stepped stroke characteristic shown in FIG. 6B, for example, when the car is decelerating by car speed control. The stroke characteristic control unit 12 may control the stepped stroke characteristic such that the start position P2 of the stepping force step D2 gradually approaches the initial position P0 in accordance with the deceleration amount by the automatic speed control of the vehicle.

In addition, the stroke characteristic control unit 12 may control the stepped stroke characteristic shown in FIG. 5A to the stepped stroke characteristic shown in FIG. 6B, for example, when the speed of the motor vehicle is reduced by the automatic speed control. That is, the starting position of the stepping force step may be brought close to the initial position P0 by inclining the stepping force step.

Processing by Vehicular Pedal Device

Figure 7A:
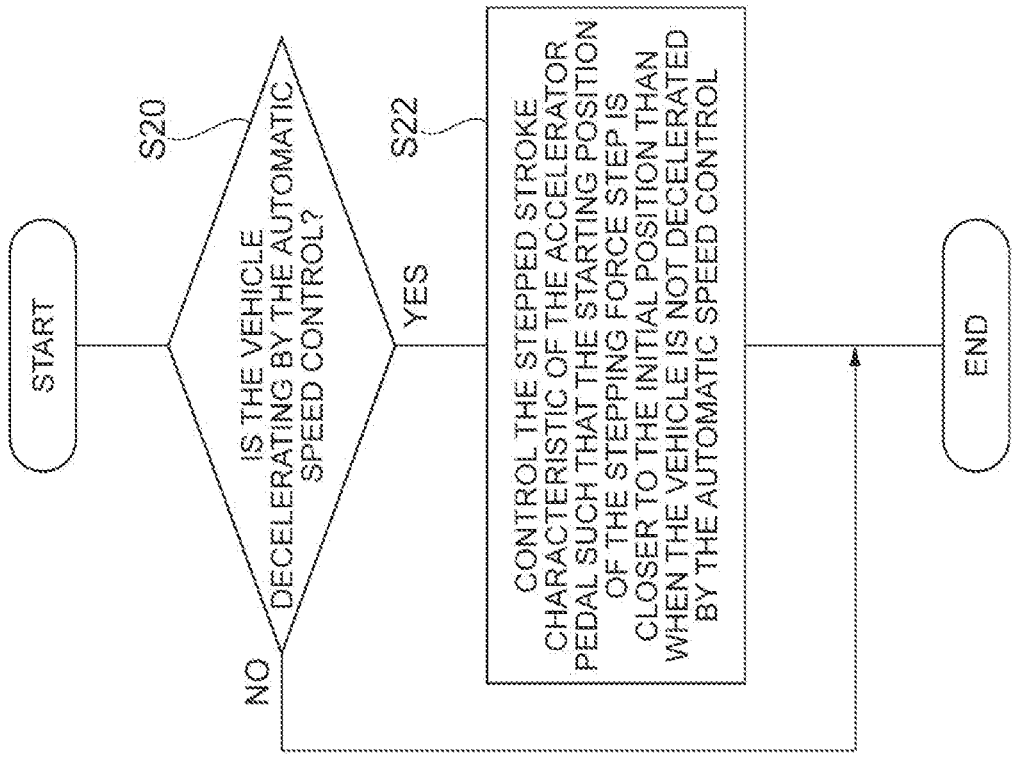
FIG. 7A is a flowchart showing an example of stroke characteristic change processing.

Next, the processing of the vehicular pedal device 1 according to the present embodiment will be described with reference to the Fig. surface. FIG. 7A is a flowchart showing an example of the stroke characteristic changing process. The stroke characteristic changing process is executed, for example, while the vehicle is traveling.

As shown in FIG. 7A, the pedal control ECU 10 of the vehicular pedal device 1 determines whether or not the automatic speed control is being executed. The pedal control ECU 10 determines whether or not the automatic speed control is being executed by communication with the vehicle control system 5, for example. When the pedal control ECU 10 determines that the automatic speed control is being executed (YES in S10), the process proceeds to S12. When the pedal control ECU 10 does not determine that the automatic speed control is being executed (NO in S10), the pedal control ECU 10 ends the current process. Thereafter, the pedal control ECU 10 repeats the processing from S10 again after a predetermined time elapses.

In S12, the pedal control ECU 10 uses the pedal state recognition unit 11 to determine whether or not a certain period of time has elapsed while the vehicular pedal is in the OFF state. The predetermined time is, for example, 0.5 seconds. Here, it is determined whether or not a predetermined time has elapsed while both the accelerator pedal 21 and the brake pedal 31 are in the OFF state. Only the accelerator pedal 21 may be determined. When the pedal control ECU 10 determines that the predetermined period of time has elapsed while the vehicular pedal is in the OFF state (YES in S12), the process proceeds to S14. When it is not determined that the predetermined time has elapsed while the vehicular pedal is in the OFF state (NO in S12), the pedal control ECU 10 ends the current process. Thereafter, the pedal control ECU 10 repeats the processing from S10 again after a predetermined time elapses.

In S14, the pedal control ECU 10 changes the stroke characteristic of the vehicular pedal to the stepped stroke characteristic by the stroke characteristic control unit 12. The stroke characteristic control unit 12 changes the stroke characteristic by controlling the reaction force applying actuator 4. For example, the stroke characteristic control unit 12 changes the stroke characteristic from the normal stroke characteristic indicated by the alternate long and 2 short dashes line in the FIG. 5A to the stepped stroke characteristic indicated by the solid line.

Figure 7B:
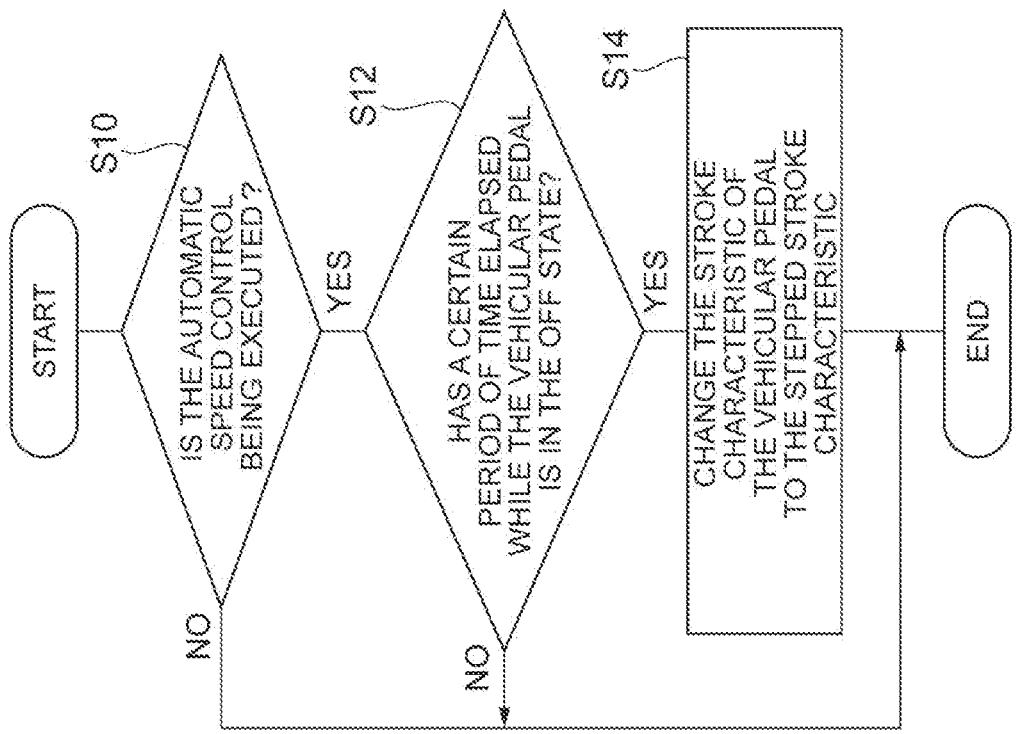
FIG. 7B is a flowchart illustrating an example of a stepped stroke characteristic control process.

FIG. 7B is a flowchart showing an example of the stepped stroke characteristic control process. The stepped stroke characteristic control process is performed during execution of the automatic speed control. The stepped stroke characteristic control process is directed only to the stepped stroke characteristic of the accelerator pedal.

As shown in FIG. 7, in S20 the pedal control ECU 10 determines whether or not the vehicle is decelerating by the automatic speed control, for example, by communicating with the vehicle control system 5. Alternatively, the pedal control ECU 10 may determine whether or not the vehicle is decelerating by the automatic speed control based on the detection result of the acceleration sensor during the execution of the automatic speed control.

When the pedal control ECU 10 determines that the vehicle is decelerating by the automatic speed control (YES in S20), the pedal control ECU 10 proceeds to S22. When the pedal control ECU 10 does not determine that the vehicle is decelerating due to the automatic speed control (NO in S20), the pedal control ECU 10 ends the current process. Thereafter, the pedal control ECU 10 repeats the processing from S20 again after a predetermined time elapses.

In S22, the pedal control ECU 10 controls the stepped stroke characteristic by the stroke characteristic control unit 12. The stroke characteristic control unit 12 controls the stepped stroke characteristic using the first reaction force applying actuator 4a. The stroke characteristic control unit 12 controls the stepped stroke characteristic of the accelerator pedal 21 such that the starting position of the stepping force step is closer to the initial position P0 than when the vehicle is not decelerated by the automatic speed control. For example, the stroke characteristic control unit 12 controls the stepped stroke characteristic shown in FIG. 5A to be the stepped stroke characteristic shown in FIG. 5B.

According to the vehicular pedal device 1 of the present embodiment described above, when the vehicular speed control such as autonomous driving or ACC is being performed, the stroke characteristic of the vehicular pedal is changed to the stepped stroke characteristic having the stepping force step corresponding to the override stroke position at which the override of the vehicular speed control is started. Therefore, in the vehicular pedal device 1, since the stepping force level difference that the driver feels while stepping on the vehicular pedal during the automatic speed control corresponds to the override stroke position at which the override of the automatic speed control is started, the driver can grasp the override stroke position of the vehicular pedal by the presence of the stepping force level difference at the time of stepping on.

In addition, according to the vehicular pedal device 1, when the driver does not intend to perform override, it is possible to place the foot on the vehicular pedal at the override stroke position by using the stepping force step. In this case, when the override of the automatic speed control is required, the driver can start the override by further depressing the vehicular pedal at the override stroke position.

According to the vehicular pedal device 1, when the vehicle is decelerated by the automatic speed control, the stepped stroke characteristic is controlled such that the starting position of the stepping force step approaches the initial position P0 of the accelerator pedal 21. Thus, the driver placing foot on the accelerator pedal 21 can grasp the deceleration of the vehicle from an increase in the reaction force of the accelerator pedal 21. In addition, according to the vehicular pedal device 1, the stepped stroke characteristic is controlled such that the starting position of the stepping force step approaches the initial position P0 of the accelerator pedal 21, and thus it is possible to urge the driver to release the accelerator, and it is possible to suppress the driver from erroneously depressing the accelerator pedal when the vehicle decelerates or stops after deceleration.

According to the pedal device 1 for a vehicle, since the elastic member 23 that applies the reference reaction force and the reaction force applying actuator 4 are configured to cooperate with each other, the load of the reaction force applying actuator 4 can be reduced as compared with a case where all the reaction forces are controlled only by the reaction force applying actuator 4.

Although the embodiments of the present disclosure have been described above, the present disclosure is not limited to the above-described embodiments. The present disclosure can be implemented in various forms including the above-described embodiments and various modifications and improvements based on the knowledge of those skilled in the art.

The vehicular pedal may be only one of the accelerator pedal 21 and the brake pedal 31. In this case, the reaction force applying actuator 4 may include one of the first reaction force applying actuator 4a for the accelerator pedal and the second reaction force applying actuator 4b for the brake pedal.

The vehicular pedal device 1 does not necessarily need to include the elastic member that applies the reference reaction force to the accelerator pedal 21. The vehicular pedal device 1 may be configured to realize all stroke characteristics by the first reaction force applying actuator 4a. The same applies to the brake pedal 31.

The stroke characteristic control unit 12 may control the stepped stroke characteristic when the deceleration amount of the vehicle is equal to or greater than the control threshold value. The control threshold value is a preset threshold value. In this case, when the deceleration amount of the vehicle is less than the control threshold value, the stroke characteristic control unit 12 does not determine that the vehicle is decelerating by the automatic speed control, and does not control the stepped stroke characteristic.

The pedal state recognition unit 11 does not necessarily need to instruct the vehicle control system 5 to accelerate or decelerate in accordance with the stroke position of the vehicular pedal in the override area OA. That is, the operation of the vehicular pedal by the driver may not be reflected in the traveling of the vehicle until the override of the automatic speed control is completed.

The vehicular pedal device 1 does not necessarily need to control the stepped stroke characteristic of the accelerator pedal 21 during deceleration of the automatic speed control. The vehicular pedal device 1 may maintain the stepped stroke characteristic as shown in FIG. 5A or FIG. 6A even during deceleration of the automatic speed control.

What is claimed is:

1. A vehicular pedal device for controlling a vehicular pedal including an accelerator pedal provided in a vehicle having an automatic speed control function, the vehicular pedal device comprising:
   a stroke characteristic control unit that controls a stroke characteristic of the vehicular pedal with respect to a pedaling force of a driver;
   wherein:
   the stroke characteristic control unit changes the stroke characteristic of the vehicular pedal to a stepped stroke characteristic when the vehicle is under automatic speed control, and the stepped stroke characteristic is a stroke characteristic having a stepping force step corresponding to an override stroke position at which override of the automatic speed control is started by operation of the vehicular pedal by the driver; and
   the stroke characteristic control unit controls the stepped stroke characteristic of the accelerator pedal such that a start position of the stepping force step is closer to an initial position of the accelerator pedal when the vehicle is decelerated by the automatic speed control than when the vehicle is not decelerated by the automatic speed control.

2. The vehicular pedal device according to claim 1, further comprising:
   an elastic member configured to apply a reference reaction force to the vehicular pedal with respect to the stepping force of the driver, and
   a reaction force applying actuator that applies an additional reaction force to the vehicular pedal;
   wherein the stroke characteristic control unit changes the stroke characteristic of the vehicular pedal to the stepped stroke characteristic by controlling the additional reaction force by the reaction force applying actuator.

* * * * *